United States Patent
Wahler et al.

(10) Patent No.: US 6,853,811 B2
(45) Date of Patent: Feb. 8, 2005

(54) DUAL-WAVE OPTICAL SHARED PROTECTION RING

(75) Inventors: Ronald A Wahler, Boulder, CO (US); Edward J Bortolini, Nederland, CO (US)

(73) Assignee: PTS Corporation, San Jose, CA (US)

( * ) Notice: Subject to any disclaimer, the term of this patent is extended or adjusted under 35 U.S.C. 154(b) by 582 days.

(21) Appl. No.: 09/954,662

(22) Filed: Sep. 12, 2001

(65) Prior Publication Data

US 2003/0067644 A1 Apr. 10, 2003

(51) Int. Cl.[7] .............................. G02F 1/00; H01S 3/00; H04J 14/00
(52) U.S. Cl. .................. 398/7; 398/3; 398/4; 398/59; 398/83; 398/14; 398/34; 398/43
(58) Field of Search .............................. 398/59, 83, 14, 398/34, 43, 68, 1–7

(56) References Cited

U.S. PATENT DOCUMENTS

| | | | | |
|---|---|---|---|---|
| 5,982,517 A | * | 11/1999 | Fishman | 398/59 |
| 5,999,288 A | * | 12/1999 | Ellinas et al. | 398/59 |
| 6,321,004 B1 | * | 11/2001 | Duerksen et al. | 385/24 |
| 6,438,286 B1 | * | 8/2002 | Duerksen et al. | 385/24 |
| 6,473,397 B1 | * | 10/2002 | Au | 370/223 |
| 6,657,952 B1 | * | 12/2003 | Shiragaki et al. | 370/223 |
| 6,701,087 B2 | * | 3/2004 | Beine et al. | 398/38 |
| 2002/0003639 A1 | * | 1/2002 | Arecco et al. | 359/119 |
| 2002/0018616 A1 | * | 2/2002 | Li | 385/24 |
| 2002/0186439 A1 | * | 12/2002 | Buabbud et al. | 359/173 |
| 2003/0025956 A1 | * | 2/2003 | Li et al. | 359/110 |

OTHER PUBLICATIONS

ITU–T, "Series G: Transmission Systems and Media, Digital Systems and Networks," G.841, 10/98.

* cited by examiner

Primary Examiner—M. R. Sedighian
Assistant Examiner—Chau M. Nguyen
(74) Attorney, Agent, or Firm—Townsend and Townsend and Crew LLP

(57) ABSTRACT

An optical ring is provided for propagating optical signal pairs over wavelength connections between nodes. Each optical signal pair includes two signals at different wavelengths. At one or more of the nodes, one signal of the pair acts as a transmit signal and the other acts as a receive signal. If a failure is detected the optical signal pair is redirected over a protection path without changing the wavelengths of the transmit and receive signals. This may be achieved by reversing a propagation direction for each of the signals comprised by the redirected optical signal pair.

29 Claims, 5 Drawing Sheets

DUAL-WAVE OPTICAL SHARED PROTECTION RING

BACKGROUND OF THE INVENTION

This application relates generally to fiber-optic communications and more specifically to techniques and devices for providing a self-healing ring architecture.

The Internet and data communications are causing an explosion in the global demand for bandwidth. Fiber optic telecommunications systems are currently deploying a relatively new technology called dense wavelength division multiplexing (DWDM) to expand the capacity of new and existing optical fiber systems to help satisfy this demand. In DWDM, multiple wavelengths of light simultaneously transport information through a single optical fiber. Each wavelength operates as an individual channel carrying data. The carrying capacity of a fiber is multiplied by the number of DWDM channels used. Today, DWDM systems employing up to 160 channels are available from multiple manufacturers, with more promised in the future.

In all telecommunication networks, there is the need to connect individual channels or circuits to individual destination points, such as an end customer or to another network. Systems that perform these functions are called cross-connects. Additionally, there is the need to add or drop particular channels at an intermediate point. Systems that perform these functions are called add-drop multiplexers (ADMs). All of these networking functions are currently performed by electronics—typically an electronic synchronous optical network ("SONET") or synchronous digital hierarchy ("SDH") system. However, SONET/SDH systems are designed to process only a single optical channel. Multiple-wavelength systems would require multiple SONET/SDH systems operating in parallel to process the many optical channels. This makes it difficult and expensive to scale DWDM networks using SONET/SDH technology.

The alternative is an all-optical network. Optical networks designed to operate at the wavelength level are commonly called "wavelength routing networks" or "optical transport networks" (OTNs). In a wavelength routing network, the individual wavelengths in a DWDM fiber must be manageable. New types of photonic network elements operating at the wavelength level are required to perform the cross-connect, ADM, and other switching functions. Two of the primary functions are optical add-drop multiplexers (OADM) and wavelength-selective cross-connects (WSXC).

Optical networks are typically configured in the form of rings, with a plurality of nodes that include network elements, such as optical equipment, electrical equipment, etc. It is generally desirable to provide a scheme with the network to protect traffic in the event that one of the nodes or fiber connections becomes disabled. This has previously been done with a 1+1 protection scheme, in which traffic is sent over a particular light path in two directions around the ring. A disadvantage with such a scheme is that including the protection scheme requires a doubling of bandwidth and operates by changing the wavelength used to carry a signal, which results in relatively slow switching from the normal path to the protection path. Furthermore, retuning of a laser is generally required to switch to a protection path, which results in slow switching.

There is, accordingly, a general need for an efficient optical-network protection scheme in which switching between normal-traffic and protection-traffic paths can be accomplished quickly.

BRIEF SUMMARY OF THE INVENTION

Embodiments of the invention are therefore directed to a more efficient optical ring structure and a method for operating an optical ring efficiently. A typical optical ring includes a plurality of nodes. In one embodiment, a plurality of optical signal pairs are propagated over wavelength connections between the nodes. Each such optical signal pair includes a first signal that has a first wavelength $\lambda_a$ and a second signal that has a second wavelength $\lambda_b$, where $\lambda_b \neq \lambda_a$. At one or more of the nodes, the first signal acts as a transmit signal and the second signal acts as a receive signal. If a failure is detected in the optical ring, such as may result from a failure at one of the nodes or may result from severing one of the wavelength connections, at least one of the optical signal pairs is redirected over a protection path. The protection path propagates signals without changing the wavelengths of the transmit and receive signals. In one embodiment, this is achieved by reversing a propagation direction for each of the signals comprised by the redirected optical signal pair.

Embodiments of the invention may be adapted to optical-ring structures where the optical signal pairs comprise a bidirectional signal or where they comprise a unidirectional signal. In one embodiment, each node in the optical ring includes at least two network subelements. For each such node, one of the subelements receives the first signal and transmits the second signal while the other subelement transmits the first signal and receives the second signal. Such subelements may comprise wavelength routers.

The wavelength pairings may be performed in various ways. For example, the first and second wavelengths may be selected from a set of N discrete wavelengths ordered sequentially by wavelength from $\lambda_1$ to $\lambda_N$ such that $\lambda_b = \lambda_{a \pm n \, (mod \, N)}$, with a common fixed integer value of $n \geq 1$ for all optical signal pairs. Alternatively, the set may be divided into m subsets so that $\lambda_{b(mod \, N/m)} = \lambda_{a \pm n(mod \, N/m)}$. In a specific embodiment that has m=2 subsets, the wavelengths of the paired signals may be related as $$\lambda_b = \begin{cases} \lambda_{a+n(mod \, N/2)} & (a \leq N/2) \\ \lambda_{((a-N/2+n)(mod \, N/2))+N/2} & (N/2 < a \leq N) \end{cases}$$

For any of these cases, in one embodiment $n \geq 4$ to limit cross-talk, which is stronger for nearby channels.

In addition to the nodes and wavelength connections, the optical ring may include a controller coupled with the nodes. The controller is configured to implement method embodiments of the invention. As such, it controls the propagation of the plurality of optical signal pairs and responds to the failure by redirecting the optical pair signals over the protection path. The controller may be coupled with a manager, which is configured to select the wavelength pairings.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral and follows a hyphen to denote one of multiple similar components. When reference is made to a reference numeral without specification to an existing sublabel, it is intended to refer to all such multiple similar components.

DETAILED DESCRIPTION OF THE INVENTION

1. Shared protection Ring

Embodiments of the invention use a shared protection ring to provide protection to an optical network. This architecture may be described as a self-healing ring and is usefully adapted for high-capacity local exchange carrier networks, among others. In general, a self-healing shared protection ring operates by providing protection paths in addition to working paths. If a working path is severed for some reason, the system is configured to provide a path for a signal along a protection path. Advantages for such a self-healing ring include its survivability and ability to be shared by all network nodes connected to it.

Figure 1:
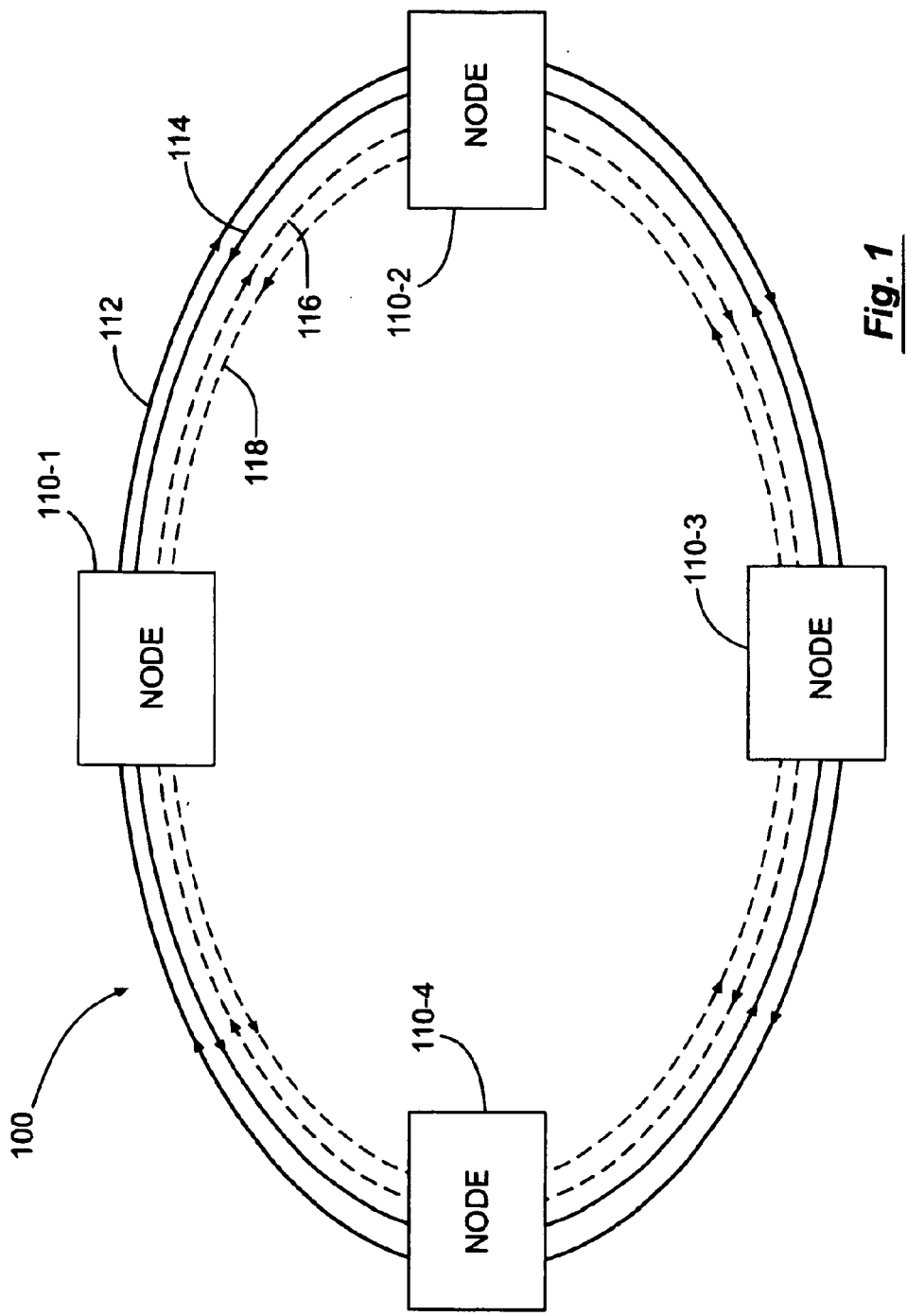
FIG. 1 is a schematic diagram illustrating general features of shared protection rings.

An example of typical self-healing ring architecture is shown schematically in FIG. 1. This example provides a four-fiber shared protection ring 100. Two of the fibers, shown as solid lines, are used as working fibers to carry the network traffic during normal operation. Two of the fibers, shown as dashed lines, are used as protection fibers to carry traffic during a failure to restore service. One of each of the pair of working and protection fibers is configured to carry traffic in a clockwise direction and the other is configured to carry traffic in a counterclockwise direction. Thus, in the example shown, a network having four nodes 110 can have traffic routed with a clockwise working fiber ring 112, a counterclockwise working fiber ring 114, a clockwise protection fiber ring 116, and a counterclockwise protection ring 118. Recovery from fiber or node failures is achieved operationally by bypassing the failure with a switching function to divert traffic onto one of the protection rings.

Figure 2:
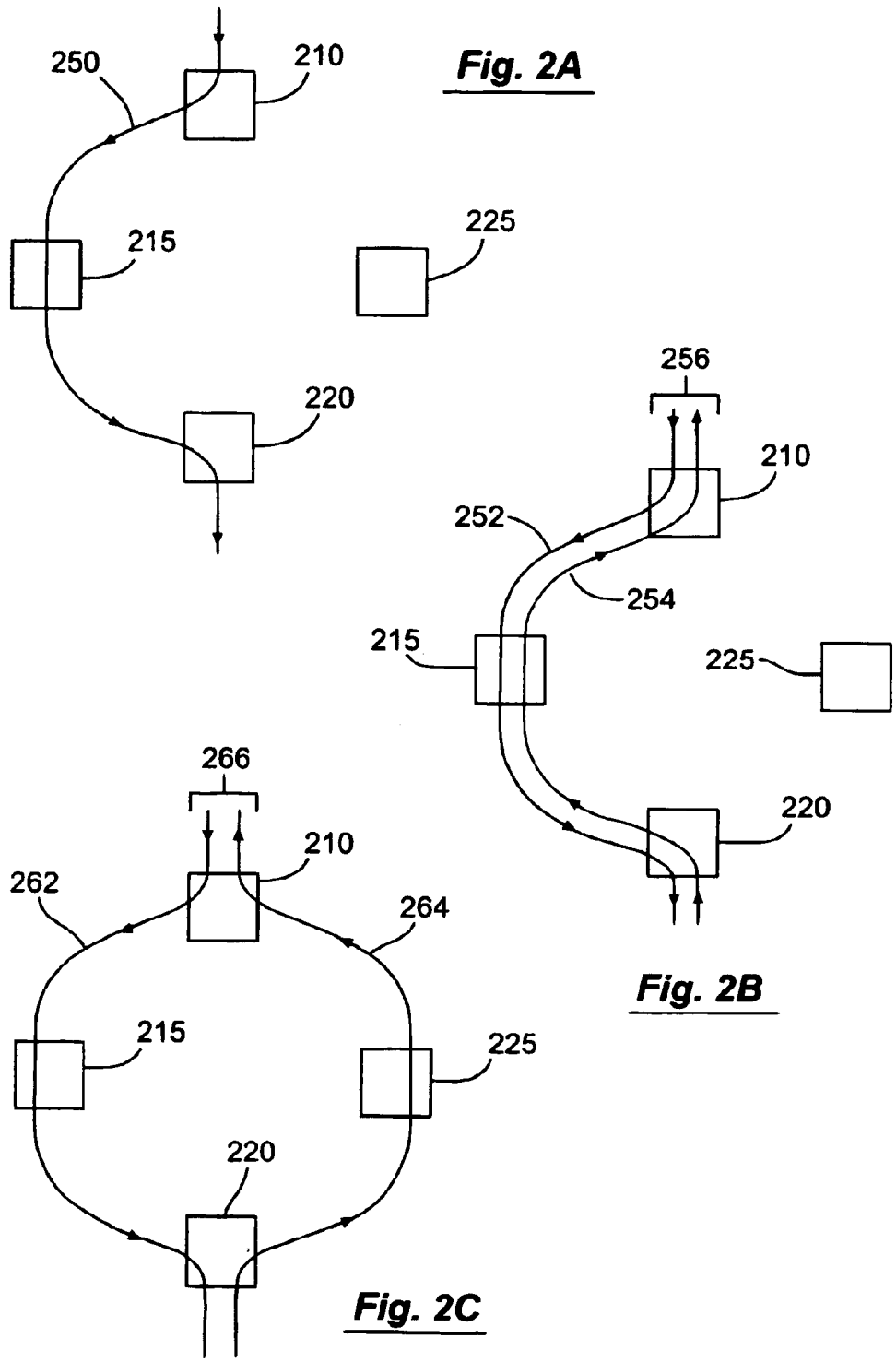
FIGS. 2A–2C are schematic diagrams that illustrate unidirectional connections, uniformly routed bidirectional connections, and diversely routed bidirectional connections.

One embodiment of the shared protection ring is the multiplex section shared protection ring, such as described the *ITU-T Recommendation G*.841 (International Telecommunication Union, 1998), which is herein incorporated by reference in its entirety for all purposes. The basic structure of the shared protection ring is as shown in FIG. 1, although in alternative embodiments, a two-fiber configuration is used instead of a four-fiber configuration. To understand the various types of configurations that may be implemented, reference is made to the types of signals illustrated in FIGS. 2A–2C. The basic type of connection is a unidirectional connection 250, shown in FIG. 2A as a connection from node 210 to node 220, passing through node 215. A bidirectional connection is made up of two opposite unidirectional connections, and may be one of two types. In FIG. 2B, a uniformly routed bidirectional connection 256 is shown between nodes 210 and 220. The bidirectional connection 256 comprises unidirectional connection 252 from node 210 to node 220 and unidirectional connection 254 from node 220 to node 210. It is described as uniformly routed because both of the unidirectional connections pass through common node 215. In contrast, FIG. 2C shows a diversely routed bidirectional connection 266 between nodes 210 and 220. While this connection also comprises oppositely directed unidirectional connections 262 and 264, it is diversely routed because the unidirectional connections pass through different nodes 215 and 225.

Thus, one embodiment of a shared protection ring may be configured as a bidirectional ring. In such a ring, normal routing of the normal traffic signals is such that both directions of a bidirectional connection travel along the ring through the same nodes but in opposite directions. This is contrasted with a unidirectional ring in which normal routing of the normal traffic is such that both directions of a bidirectional connection travel around the ring in the same direction. Thus, in a unidirectional ring, each bidirectional connection uses capacity along the entire circumference of the ring. Unidirectional protection switching therefore uses an architecture in which a unidirectional failure is corrected by switching only the affected direction from a working fiber to a protection fiber. With bidirectional protection switching, both directions are switched to protection fibers even if the failure is unidirectional.

Signal routing with shared protection rings may generally occur in one of two directions ("clockwise" or "counterclockwise"), with the shorter direction normally being preferred. For some applications, the longer direction may be preferred, such as may be desirable for balancing load capabilities. A multiplex section shared protection ring operates generally by switching normal traffic directed towards a failure to the protection channels transmitted in the opposite direction. Instead of traveling the short way, this bridged traffic then travels the long way around to the switching node, where it is switched back onto working channels. This may cause the signal to overshoot its destination and be redirected back to that destination at the switching node.

Figure 3:
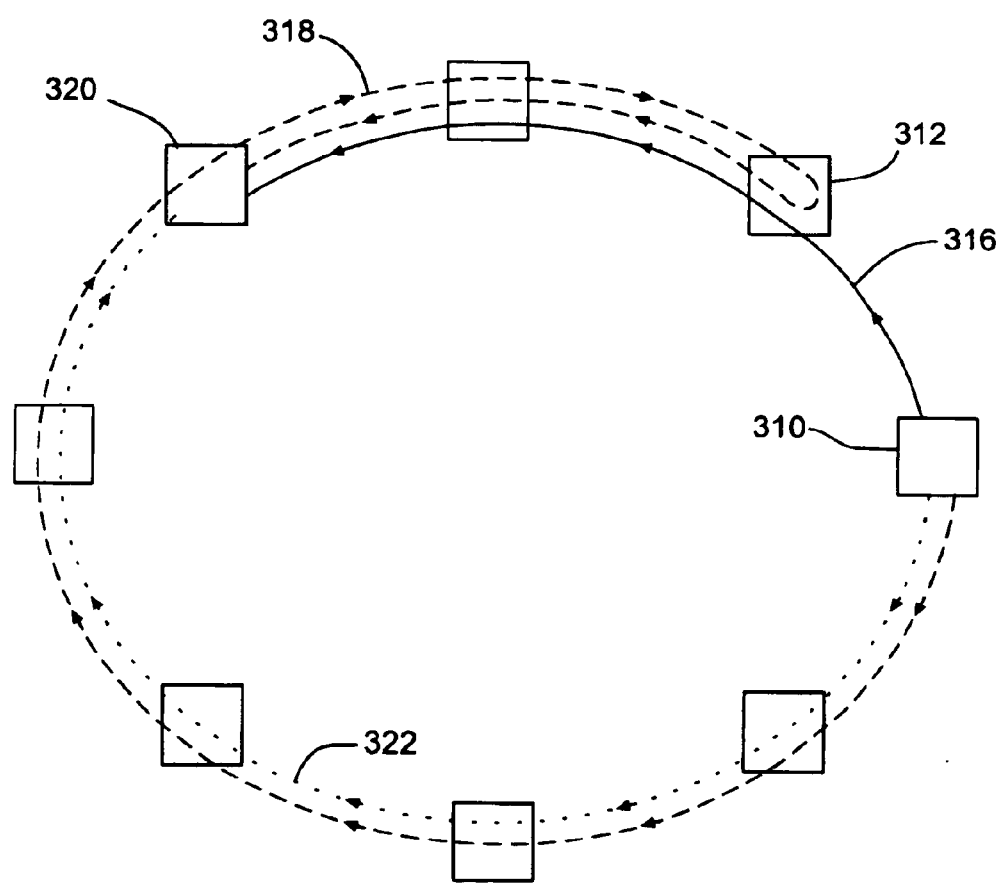
FIG. 3 is a schematic diagram illustrating the effect of a failure in a shared protection ring.

In an alternative embodiment, head-end switching is used. In this embodiment, the normal traffic is switched from working to protection channels only for the span between which the command is initiated and the adjacent node to which the command is destined. The difference in switching modes is illustrated in FIG. 3, which shows eight nodes and considers a signal to be routed from node 310 to 320. The normal traffic flow is therefore counterclockwise along path 316, which provides the shortest distance to node 320 from node 310. A failure of the fiber connection between nodes 310 and 312, however, would require that the signal be rerouted on protection channels. With a multiplex section shared protection ring, the signal travels clockwise along path 318 on protection channels from node 310 to node 312, where it is switched back to normal channels for counterclockwise propagation to node 320. With head-end switching, however, switching between protection and normal channels may occur at intermediate nodes. Thus, the signal is propagated clockwise on protection channels along path 322, stopping at node 320. The shorter path provided by head-end switching results in shorter propagation delays and correspondingly less performance degradation.

2. Dual-Wave Configuration

According to embodiments of the invention, an algorithm is used for allocation of different-wavelength signals on a shared protection ring. In particular, for a ring having a plurality of optical paths, each path is assigned a transmit wavelength $\lambda_t$ and a receive wavelength $\lambda_r$, where $\lambda_t \neq \lambda_r$. An example of a ring 400 is provided in FIG. 4, which shows an arrangement that uses four nodes. At each node is a network element 410, which may comprise, for example, a wavelength router configured for independently routing optical signals according to their wavelength. One example of a wavelength router that may be used with such embodiments is described in the copending, commonly assigned United States Patent Application, filed Nov. 16, 1999 and assigned Ser. No. 09/442,061, entitled "Wavelength Router," which is herein incorporated by reference for all purposes. Other wavelength routers, such as may be known to those of skill in the art, may alternatively be used. In other embodiments, the network elements 410 may comprise other optical elements or electrical equipment.

Figure 4:
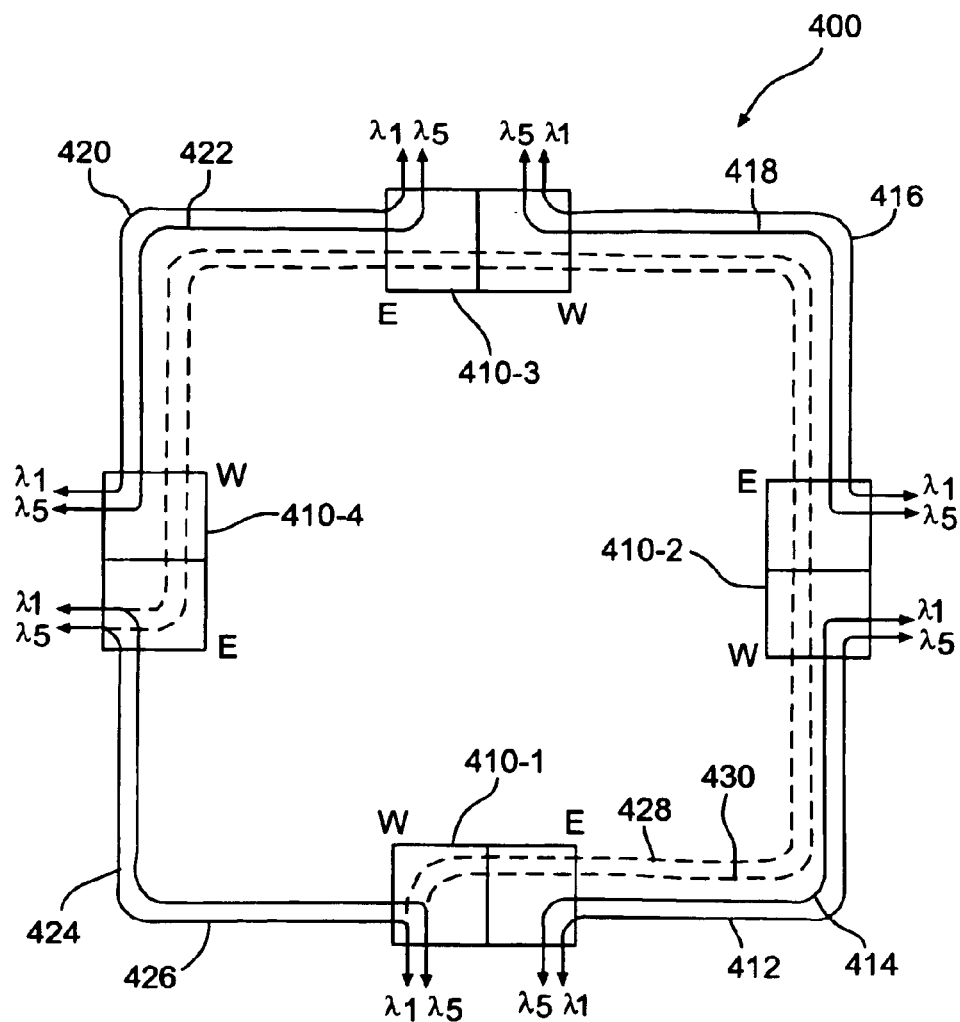
FIG. 4 is a schematic diagram illustrating the operation of a dual-wave optical shared protection ring.

The ring 400 shown illustratively in FIG. 4 is configured to use bidirectional connections, although it will be apparent from the following description that the wavelength-assignment algorithm may also be adapted for use with unidirectional connections. At each node in the ring 400, the network elements 410 may comprise a pair of subelements, denoted "E" and "W" in the figure. In each case, a bidirectional connection exists between the "W" subelement of one node and the "E" subelement of a subsequent node. For this example, the wavelength pair has been shown as $\lambda_1/\lambda_5$, with one of those wavelengths being used as the transmit wavelength and the other being used as the receive wavelength at each node. While the figure illustratively shows four nodes, the invention may be used with any number of nodes; in one embodiment, the ring 400 comprises sixteen nodes.

Thus, at the node with network element 410-1, for example, $\lambda_5$ is the transmit wavelength for the "E" subelement and $\lambda_1$ is the receive wavelength. These wavelengths are propagated respectively on normal connections 414 and 412 to and from the "W" subelement at the node with network element 410-2. Conversely, at the "W" subelement of network element 410-1, $\lambda_1$ is used as the transmit wavelength on normal connection 424 and $\lambda_5$ is used as the receive wavelength on normal connection 426. The ring 400 is completed with other normal connections 416, 418, 420, and 422, resulting in a configuration where every "E" subelement in the ring 400 uses $\lambda_5$ as a transmit wavelength and uses $\lambda_1$ as a receive wavelength.

Protection paths 428 and 430 are shown with dotted lines in the event there is a failure with normal connections 424 or 426. The normal traffic direction for $\lambda_1$ is everywhere clockwise, but the protection traffic direction for that wavelength is counterclockwise. Because $\lambda_1$ is different from $\lambda_5$, which has a normal traffic direction that is also counterclockwise, there is no interference with the signals. The same is true for the protection traffic direction of $\lambda_5$, which is clockwise; it does not interfere with the normal $\lambda_1$ traffic, even though also clockwise, because of the difference in wavelengths. The use of $\lambda_1$ and $\lambda_5$ as a pair was merely for purposes of illustration. The same principles apply for any wavelength pair that may be used. More generally, embodiments of the invention include configurations in which wavelength pairs are assigned such that transmit and receive signals propagate in different directions around the ring and at different wavelengths. Switching to a protection path that has a direction opposite to that used for normal traffic is thereby simplified because on any particular channel, that opposite direction is only being used for normal traffic having a different wavelength.

A particular advantage of the arrangement is that for a given signal, the protection wavelength is the same as the working wavelength. Certain complexities that arise from a system in which the wavelength must be changed to switch from working traffic to protection traffic are thereby avoided. Specifically, such a change in wavelength typically requires retuning of lasers and/or filters within the system from the old wavelength to the new wavelength. Such retuning generally requires that operation of the equipment temporarily be terminated since the act of retuning lasers and/or filters may cause the changing signal wavelength to pass through one or more other active wavelengths, thereby otherwise causing interference with those active signals. Also, the changing of filters typically uses a mechanical process that can take as long as 12 ms for each switch. The use of the same wavelength for both normal and protection traffic thus increases the efficiency at which the system operates.

The allocation of transmit/receive wavelength pairs may be performed differently in various embodiments. Typically, the network will be configured to use a plurality of discrete wavelengths $\lambda_1-\lambda_N$ from which pair assignments may be drawn. For example, in one embodiment, the transmit wavelength $\lambda_t$ is related to the receive wavelength $\lambda_r$ by $$\lambda_t = \lambda_{r \pm n (mod\ N)},$$

where the ± corresponds to whether the "E" or "W" subelements are being used. The example shown in FIG. 4 uses a fixed value of n=4, so that the transmit and receive wavelengths always differ by four discrete wavelength values. In one embodiment n≧4 to prevent cross-talk between wavelength values that may otherwise be sufficiently close for such cross-talk to occur.

In another embodiment, the group of wavelengths may be subdivided into two or more subgroups, with pair assignments being drawn from the subgroups. For example, in one embodiment, the transmit wavelength $\lambda_t$ is related to the receive wavelength $\lambda_r$ by $$\lambda_{t(mod\ N/m)} = \lambda_{r \pm n (mod\ N/m)},$$

where m is the number of subgroups. In the specific embodiment where m=2, the transmit and receive wavelengths may be related according to the specific scheme $$\lambda_t = \begin{cases} \lambda_{r+n(mod\ N/2)} & (r \leq N/2) \\ \lambda_{((r-N/2+n)(mod\ N/2))+N/2} & (N/2 < r \leq N) \end{cases}$$

For example, for a system configured to use N=80 different wavelengths, the wavelength pairing may be performed for the two groups $\lambda_1-\lambda_{40}$ and separately for $\lambda_{41}-\lambda_{80}$. Using a fixed separation n=4 results in the wavelength allocation shown in Table I.

TABLE I

| Working Clockwise | | Protection (Counter-clockwise) | | Protection (Counter-clockwise) | | Working (Clockwise) | |
|---|---|---|---|---|---|---|---|
| Receive | Transmit | Receive | Transmit | Receive | Transmit | Receive | Transmit |
| $\lambda_1$ | $\lambda_5$ | $\lambda_5$ | $\lambda_1$ | $\lambda_{41}$ | $\lambda_{45}$ | $\lambda_{45}$ | $\lambda_{41}$ |
| $\lambda_2$ | $\lambda_6$ | $\lambda_6$ | $\lambda_2$ | $\lambda_{42}$ | $\lambda_{46}$ | $\lambda_{46}$ | $\lambda_{42}$ |
| $\lambda_3$ | $\lambda_7$ | $\lambda_7$ | $\lambda_3$ | $\lambda_{43}$ | $\lambda_{47}$ | $\lambda_{47}$ | $\lambda_{43}$ |
| ... | ... | ... | ... | ... | ... | ... | ... |
| $\lambda_{38}$ | $\lambda_2$ | $\lambda_2$ | $\lambda_{38}$ | $\lambda_{78}$ | $\lambda_{42}$ | $\lambda_{42}$ | $\lambda_{78}$ |
| $\lambda_{39}$ | $\lambda_3$ | $\lambda_3$ | $\lambda_{39}$ | $\lambda_{79}$ | $\lambda_{43}$ | $\lambda_{43}$ | $\lambda_{79}$ |
| $\lambda_{40}$ | $\lambda_4$ | $\lambda_4$ | $\lambda_{40}$ | $\lambda_{80}$ | $\lambda_{44}$ | $\lambda_{44}$ | $\lambda_{80}$ |

It is noted that the described embodiments can be achieved through appropriate modification of an existing optical ring that uses a 1+1 protection scheme. The existing architecture of a 1+1 protection scheme already includes paths for the propagation of signals in opposite directions around the ring. By dropping the protection side of the 1+1 architecture, which itself uses half the available bandwidth, and introducing the wavelength allocation scheme to both the working path, the dual-wave shared protection ring according to embodiments of the invention can be produced.

Figure 5:
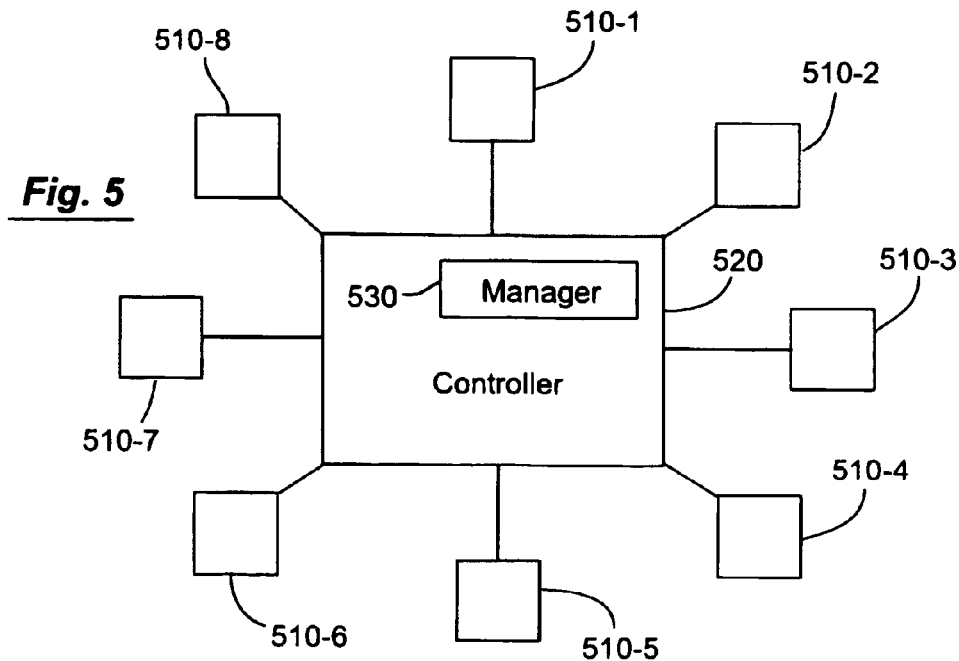
FIG. 5 is a schematic diagram illustrating one embodiment for controlling operation of a dual-wave optical shared protection ring.

There are also a number of ways in which the methods of the invention may physically be implemented with an optical ring. One such implementation is shown schematically in FIG. 5 for a ring having eight nodes 510. A central controller 520 is configured to operate the propagation of signals through the ring. In particular, traffic is routed normally by the controller 520 until a fault, either with the operation of one of the nodes or with a connection between nodes is detected. The central controller 520 then causes rerouting of the signal along the protection path as described above. The central controller 520 may interface with a manager 530, which is configured for determining the wavelength pairings to be implemented by the controller 520.

Figure 6:
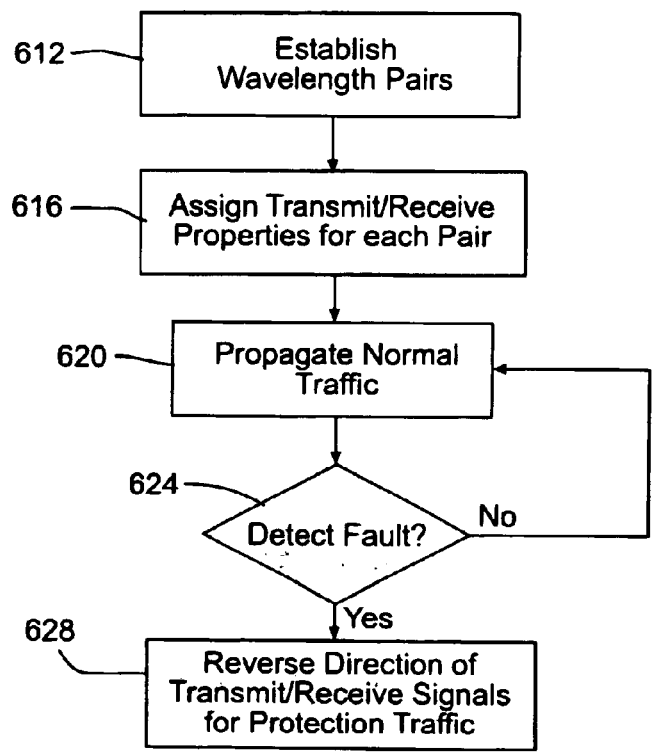
FIG. 6 is a flow diagram illustrating one embodiment in which the dual-wave optical shared protection ring may be operated.

The interaction of the manager 530 with the controller 520 to implement methods of the invention is illustrated with a flow diagram in FIG. 6. At block 612, the manager 530 establishes the wavelength pairings according to an algorithm such as described above. At block 616, the manager assigns appropriate transmit and receive properties to each of the wavelengths in every pairing. These assignments are used by the controller 520 at block 620 to propagate traffic normally through the optical ring. Normal propagation is monitored continually at block 624 to detect a fault that may require use of a protection path. At step 628, if a fault is detected, traffic is switched to the protection path simply by switching the direction for both signals in a wavelength pairing. Because of the structure of the optical ring, this is done without changing the wavelengths of the transmit or receive signals.

Having described several embodiments, it will be recognized by those of skill in the art that various modifications, alternative constructions, and equivalents may be used without departing from the spirit of the invention. Accordingly, the above description should not be taken as limiting the scope of the invention, which is defined in the following claims.

What is claimed is:

1. A method for operating an optical ring, the optical ring including a plurality of nodes, the method comprising:
   propagating a plurality of optical signal pairs over a plurality of wavelength connections between the nodes, wherein each such optical signal pair includes a first signal having a first wavelength $\lambda_a$ and a second signal having a second wavelength $\lambda_b$ that differs from $\lambda_a$, and wherein at least one of the plurality of nodes the first signal acts as a transmit signal and the second signal acts as a receive signal; and
   redirecting at least one of the optical signal pairs over a protection path in response to a failure in the optical ring, wherein the protection path propagates signals with respect to the at least one of the plurality of nodes without changing the wavelengths of the transmit and receive signals.
   wherein, for each optical signal pair, the first and second wavelengths are selected from a set of N discrete wavelengths ordered sequentially by wavelength from $\lambda_1$ to $\lambda_N$ and divided into m subsets such that $\lambda_{b(mod\ N/m)} = \lambda_{a \pm n(mod\ N/m)}$, with a common fixed integer value of $n \geq 1$ for the plurality of optical signal pairs.

2. The method recited in claim 1 wherein at least one of the optical signal pairs comprises a bidirectional signal.

3. The method recited in claim 1 wherein at least one of the optical signal pairs comprises a unidirectional signal.

4. The method recited in claim 1 wherein redirecting at least one of the optical signal pairs over a protection path comprises reversing a propagation direction for each of the first and second signals comprised by the at least one of the optical signal pairs.

5. The method recited in claim 1 wherein each node comprises at least two network subelements, wherein for each node a first of the network subelements is configured to receive the first signal and transmit the second signal, and a second of the network subelements is configured to transmit the first signal and receive the second signal.

6. The method recited in claim 5 wherein each network subelement comprises a wavelength router.

7. The method recited in claim 1 wherein $n \geq 4$.

8. The method recited in claim 1 wherein m=1, whereby $\lambda_b = \lambda_{a \pm n(mod\ N)}$.

9. The method recited in claim 1 wherein m>2.

10. The method recited in claim 1 wherein m=2 subsets such that $$\lambda_b = \begin{cases} \lambda_{a+n(mod\ N/2)} & (a \leq N/2) \\ \lambda_{N/2 + a + n(mod\ N/2), N/2} & (N/2 < a \leq N) \end{cases}$$

11. The method recited in claim 1 wherein redirecting at least one of the optical signal pairs over a protection path comprises using head-end switching.

12. The method recited in claim 1 wherein the failure comprises a connection failure.

13. The method recited in claim 1 wherein the failure comprises a node failure.

14. An optical ring comprising:
a plurality of nodes, with a network element disposed at each such node;
a plurality of optical wavelength connections between the nodes configured for the propagation of optical signals;
a controller coupled with the plurality of nodes, wherein the controller is configured to propagate a plurality of optical signal pairs, each such optical signal pair including a first signal having a first wavelength $\lambda_a$ and a second signal having a second wavelength $\lambda_b$ that differs from $\lambda_a$, such that at least one of the plurality of nodes the first signal acts as a transmit signal and the second signal acts as a receive signal, and to respond to a failure in the optical ring by redirecting at least one of the optical signal pairs over a protection path without changing the wavelengths of the transmit and receive signals; and
a manager configured, for each optical signal pair, to select the first and second wavelengths from a set of N discrete wavelengths ordered sequentially by wavelength from $\lambda_1$ to $\lambda_N$ and divided into m subsets such that $\lambda_{b(mod\ N/m)} = \lambda_{a\pm n(mod\ N/m)}$, with a common fixed integer value of $n \geq 1$ for the plurality of optical signal pairs.

15. The optical ring recited in claim 14 wherein at least one of the optical signal pairs comprises a bidirectional signal.

16. The optical ring recited in claim 14 wherein at least one of the optical signal pairs comprises a unidirectional signal.

17. The optical ring recited in claim 14 wherein redirecting at least one of the optical signal pairs over a protection path comprises reversing a propagation direction for each of the first and second signals comprised by the at least one of the optical signal pairs.

18. The optical ring recited in claim 14 wherein each network element comprises at least two network subelements, wherein the controller is configured such that at each node, a first of the network subelements receives the first signal and transmits the second signal, and a second of the network subelements transmits the first signal and receives the second signal.

19. The optical ring recited in claim 18 wherein each network subelement comprises a wavelength router.

20. The optical ring recited in claim 14 wherein $n \geq 4$.

21. The optical ring recited in claim 14 wherein m=1, whereby $\lambda_b = \lambda_{a\pm n(mod\ N/m)}$.

22. The optical ring recited in claim 14 wherein $m \geq 2$.

23. The method recited in claim 14 wherein $m \geq 2$ subsets such that $$\lambda_b = \begin{cases} \lambda_{a+n(mod\ N/2)} & (a \leq N/2) \\ \lambda_{(a-N/2)+n(mod\ N/2)+N/2} & (N/2 < a \leq N) \end{cases}$$

24. A system for operating a wavelength division multiplexing network comprising an optical ring of nodes interconnected by a plurality of wavelength connections, the system comprising:
a manager configured to select pairs of wavelengths from a set of N discrete wavelengths ordered sequentially by wavelength from $\lambda_1$ to $\lambda_N$, the pairs of wavelengths defining a plurality of optical signal pairs comprising a first signal having a first wavelength $\lambda_a$ and a second signal having a second wavelength $\lambda_b$ that differs from $\lambda_a$, wherein the manager divides the ordered set of discrete wavelengths into m subsets and, for each optical signal pair, selects the first and second wavelengths such that $\lambda_{b(mod\ N/m)} = \lambda_{a\pm n(mod\ N/m)}$, with a common fixed integer value of $n \geq 1$ for the plurality of optical signal pairs; and
a controller coupled with the manager and the optical ring, wherein the controller is configured to propagate at least one of the plurality of optical signal pairs along a normal traffic path within the optical ring such that at least one of the nodes the first signal acts as a transmit signal and the second signal acts as a receive signal and to redirect the at least one of the optical signal pairs over a protection traffic path in response to a failure in the optical ring without changing the wavelengths of the transmit and receive signals.

25. The system recited in claim 24 wherein the controller is configured to redirect the at least one of the optical signal pairs by reversing a propagation direction for each of the first and second signals comprised by the at least one of the optical signal pairs.

26. The system recited in claim 24 wherein, m=1, whereby, $\lambda_b = \lambda_{a\pm n(mod\ N)}$.

27. The system recited in claim 24 wherein m=2 such that $$\lambda_b = \begin{cases} \lambda_{a+n(mod\ N/2)} & (a \leq N/2) \\ \lambda_{(a-N/2)+n(mod\ N/2)+N/2} & (N/2 < a \leq N) \end{cases}$$

28. The system recited in claim 28 wherein the means for redirecting is configured to reverse a propagation direction for each of the first and second signals comprised by the least one of the optical signal pairs.

29. A system for operating a wavelength division multiplexing network comprising an optical ring of nodes interconnected by a plurality of wavelength connections, the system comprising:
means for selecting pairs of wavelengths from a set of N discrete wavelengths ordered sequentially by wavelength from $\lambda_1$ to $\lambda_N$, the pairs of wavelengths defining a plurality of optical signal pairs comprising a first signal having a first wavelength $\lambda_a$ and a second signal having a second wavelength $\lambda_b$ that differs from $\lambda_a$; wherein the means for selecting pairs of wavelength divides the ordered set of discrete wavelengths into m subsets and, for each optical signal such that $\lambda_{b(mod\ N/m)} = \lambda_{a\pm n(mod\ N/m)}$, with a common fixed integer value of $n \geq 1$ for the plurality of optical signal pairs;
means for propagating at least one of the plurality of optical signal pairs along a normal traffic path within the optical ring such that at least one of the nodes the first signal acts as a transmit signal and the second signal acts as a receive signal; and
means for redirecting the at least one of the optical signal pairs over a protection traffic path in response to a failure in the optical ring without changing the wavelengths of the transmit and receive signals.

* * * * *